Figure 6:
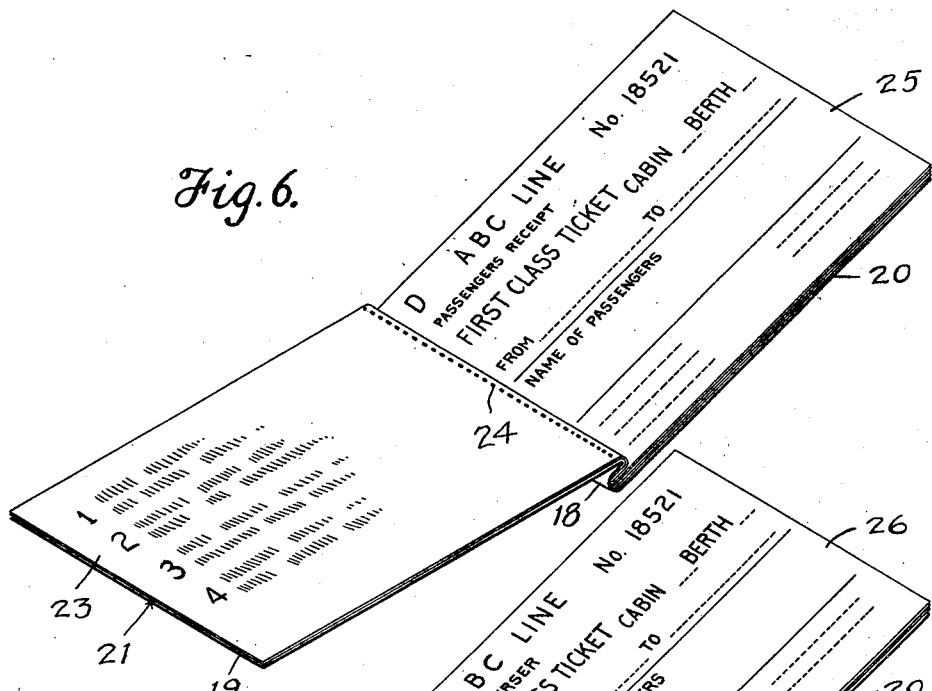

Jan. 27, 1931.    C. S. VOELCKER    1,790,033
STEAMSHIP TICKET
Filed July 8, 1927    5 Sheets-Sheet 1
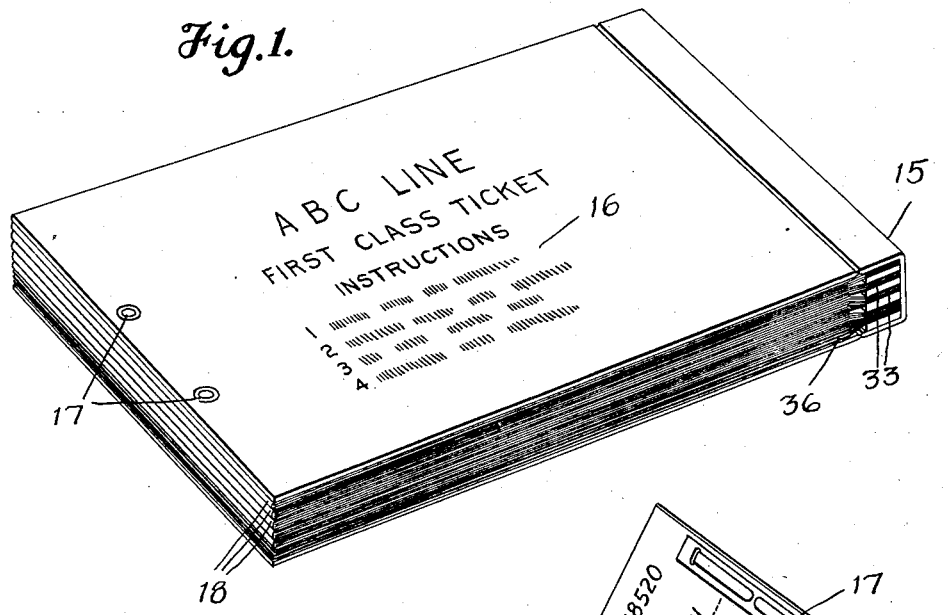
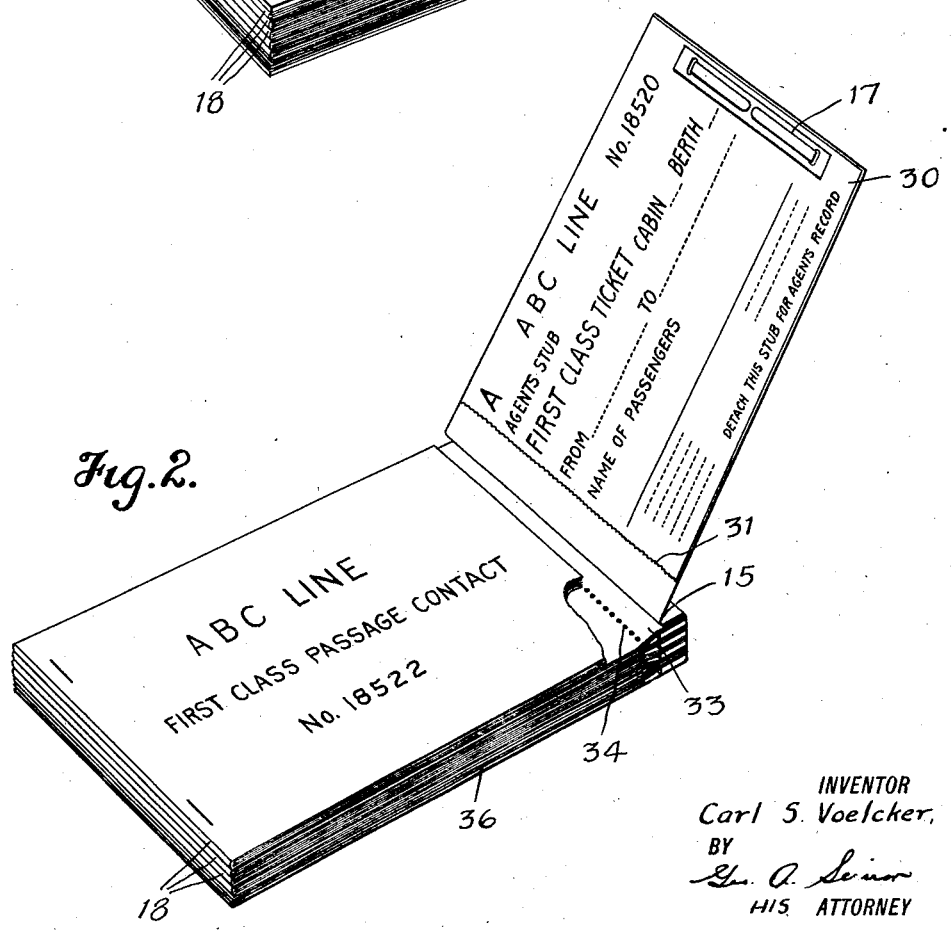
INVENTOR
Carl S. Voelcker,
BY
HIS ATTORNEY Jan. 27, 1931.  C. S. VOELCKER  1,790,033
STEAMSHIP TICKET
Filed July 8, 1927   5 Sheets-Sheet 2
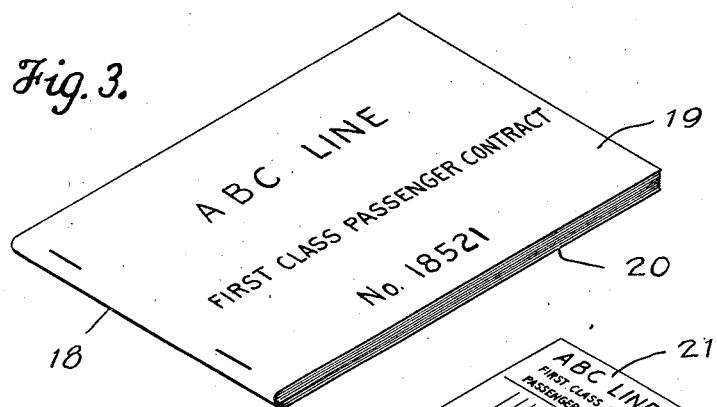
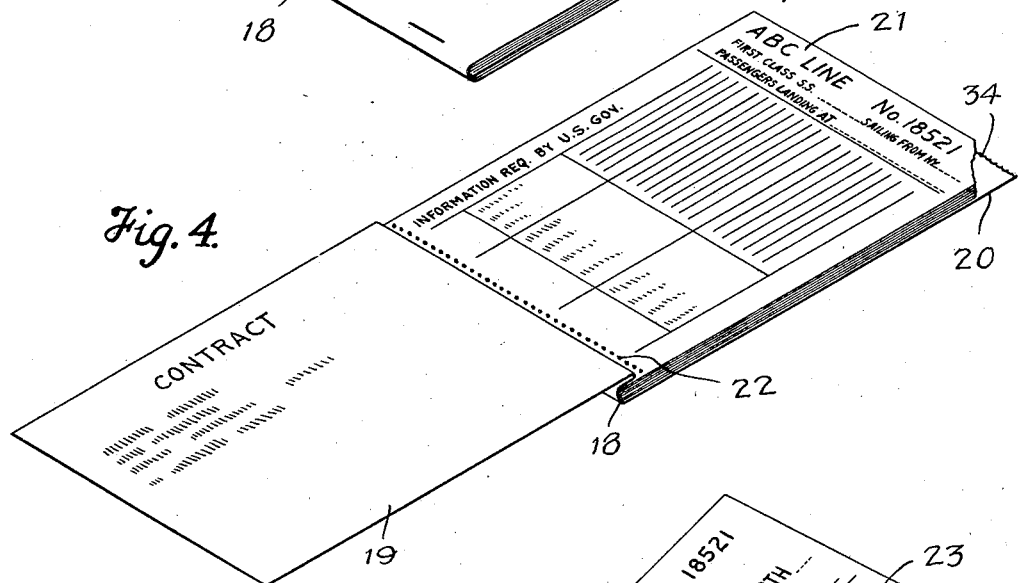
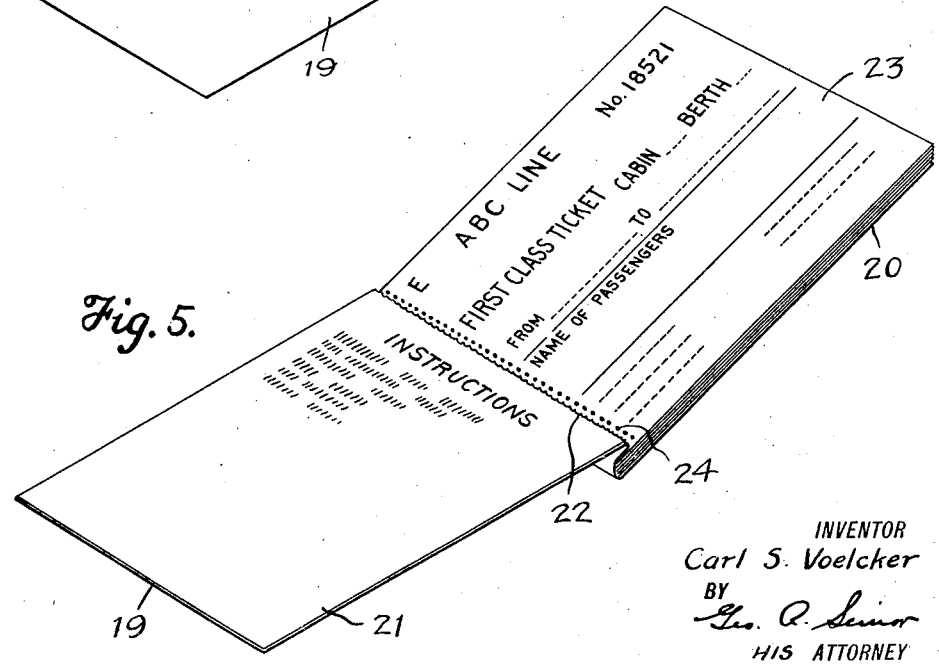
INVENTOR
Carl S. Voelcker
BY
HIS ATTORNEY Jan. 27, 1931.  C. S. VOELCKER  1,790,033
STEAMSHIP TICKET
Filed July 8, 1927   5 Sheets-Sheet 3

INVENTOR
Carl S. Voelcker
BY
HIS ATTORNEY

Jan. 27, 1931.  C. S. VOELCKER  1,790,033
STEAMSHIP TICKET
Filed July 8, 1927   5 Sheets-Sheet 4
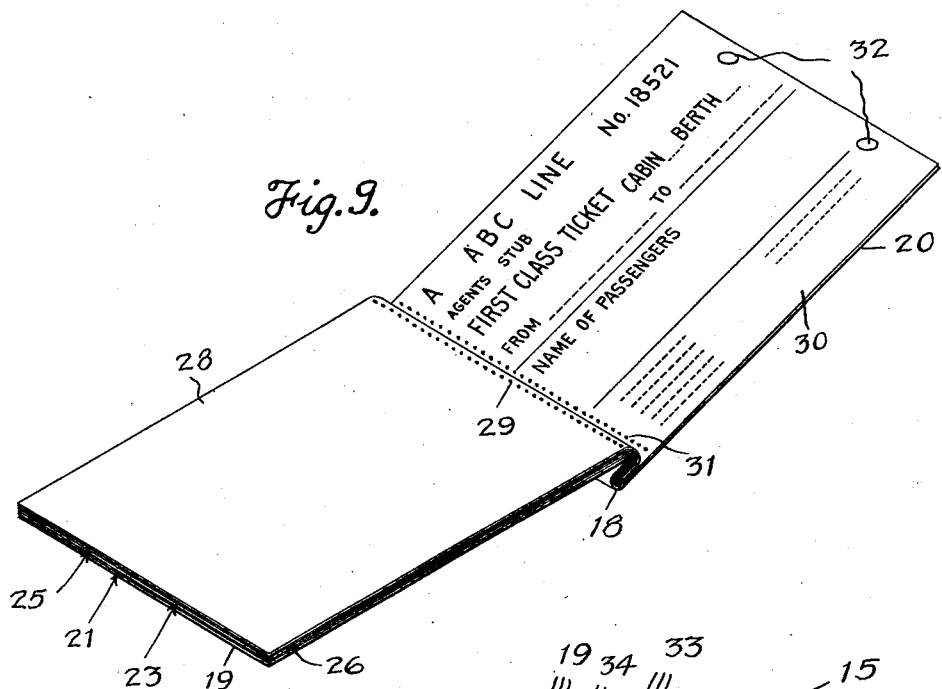
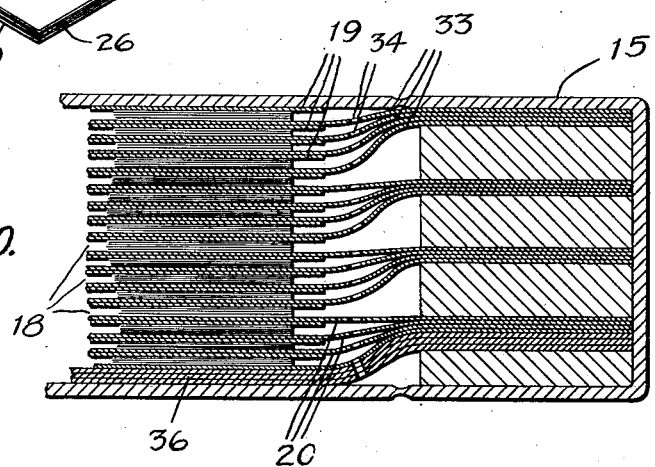
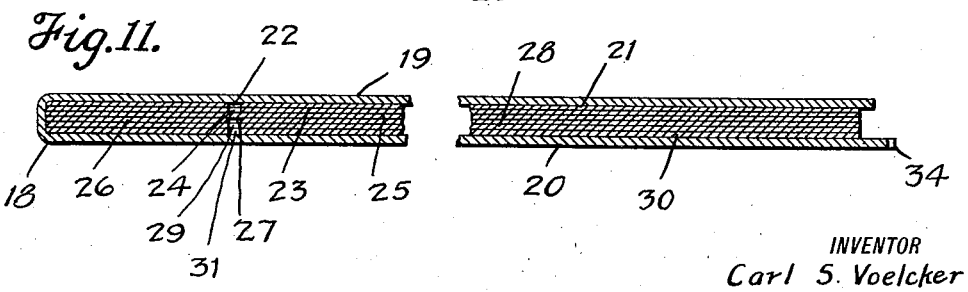
INVENTOR
Carl S. Voelcker
BY
HIS ATTORNEY Jan. 27, 1931. C. S. VOELCKER 1,790,033
STEAMSHIP TICKET
Filed July 8, 1927 5 Sheets-Sheet 5

INVENTOR
Carl S. Voelcker
BY
HIS ATTORNEY

Patented Jan. 27, 1931

1,790,033

UNITED STATES PATENT OFFICE

CARL S. VOELCKER, OF BROOKLYN, NEW YORK

STEAMSHIP TICKET

Application filed July 8, 1927. Serial No. 204,201.

The invention relates to steamship tickets and has for its object to provide a ticket in the form of a booklet, saving a great amount of time when the ticket is being originally made out and also acting as a great convenience to the passenger and other people who have to handle the ticket after it has been issued.

At present the majority of the steamship tickets are made out on a large sheet. It is necessary for the agent or person writing out the ticket to do a great deal of duplicating as the name of the passenger or passengers, destination, cabin and berth numbers and various other information and data must be supplied in numerous places. The ticket is bulky and inconvenient to handle both for the passenger and officers on the dock and ship. The object of the present invention is to overcome these difficulties and provide a steamship ticket that can be filled out with a minimum amount of work and one that is compact and easy to handle after it has been issued.
The invention contemplates a plurality of booklets all of which are secured by one of their leaves in a binder. After the ticket has been made out the booklet may readily be removed from the binder and issued to the passenger. Two of the leaves of the booklet are removed by the agent making out the ticket and one is secured to the binder where it acts as the agent's record and the other is forwarded to the office of the steamship company. The remaining leaves of the booklet are removed at different times by various ship offices and one leaf which is not removable remains in the booklet and acts as the passenger's receipt or record.
Other objects and advantages will become apparent as this specification proceeds, a preferred form of the invention being described. Referring to the drawings forming a part thereof:
Fig. 1 is a perspective view of the complete binder or book of tickets, closed, Fig. 2 is a perspective view of the book with the cover opened, Fig. 3 is a perspective view of one booklet or ticket, closed, Figs. 4 to 9 are perspective views of the booklet or ticket opened at the various pages, Fig. 10 is an enlarged detail sectional view of the complete binder or book of tickets taken at the binding portion, Fig. 11 is an enlarged detail sectional view of one of the booklets or tickets removed from the binder and having its intermediate portion broken out for economy of space,

Figure 12:
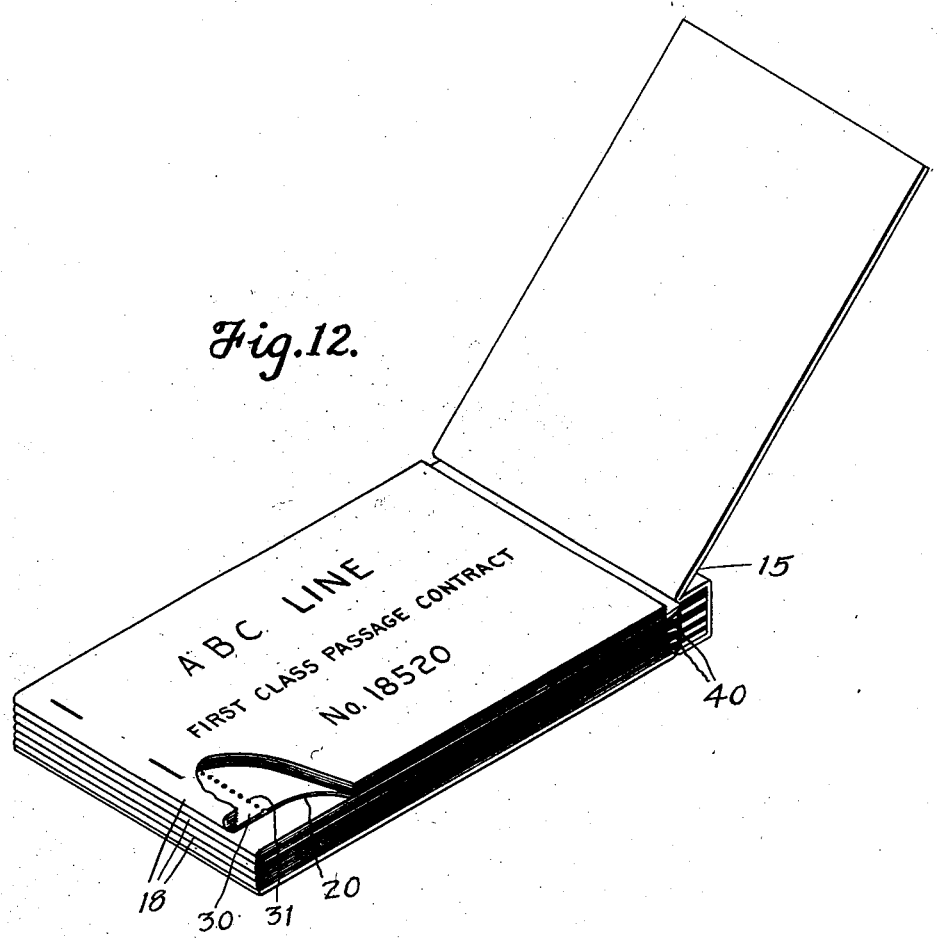
Figure 13:
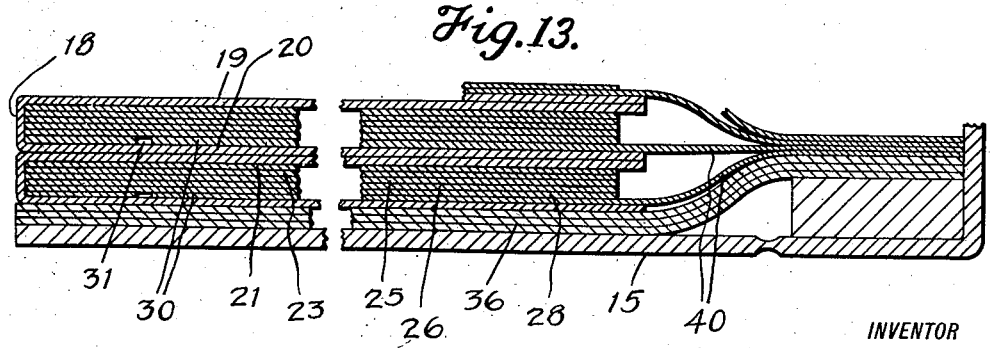

Fig. 12 is a perspective view of an alternate construction, showing a complete binder or book with its cover opened; and Fig. 13 is an enlarged detail sectional view of the form shown in Fig. 12.

Referring to Figs. 1 to 11 of the drawings the reference numeral 15 designates the binder which may be of any desired form or construction. On the back of one of the covers of the binder a list of instructions 16 may be imprinted and a clip 17 of any approved form may be secured to the cover. The purpose of the clip will be described hereinafter.

Each ticket comprises a booklet 18 as illustrated particularly in Fig. 3. Each booklet has a front cover 19, rear cover 20 and a plurality of leaves. The outside of the front cover may bear the name of the steamship line, class of passage and the number of the ticket. All of the leaves bear a corresponding ticket number to the outer cover. The inside of the covers may have the contract under which the ticket is sold imprinted thereon. The outside of the rear cover may be used for any suitable purpose such as imprinting thereon a list of the various offices of the steamship line in different cities or countries. The foregoing arrangements of printed matter may be widely varied.

The first sheet 21 of the booklet (see Fig. 4) carries information required of the passengers by the Government. This information must be supplied and the sheet filled out prior to the passenger embarking on the boat and for that reason is preferably the first sheet in the booklet although this may be varied. When presented at the gangplank of the ship the collector in charge tears this sheet from the booklet along the line of the perforations 22 and it is then forwarded to the proper government office. The back of this sheet may carry the necessary instructions as to how to fill out properly the front part.

The second sheet 23 of the booklet (see Fig. 5) might be termed the ticket proper and is perforated at 24 so that it may be readily removed at the proper time. This sheet has imprinted thereon spaces to be filled out with the necessary information regarding the passenger's or passengers' names, destination, cabin and berth number, etc., and is preferably printed on safety paper. The sheet 23 is torn out and taken by the officer at the gangplank of the boat along with the sheet 21.

The third leaf 25 in the booklet as illustrated in Fig. 6 is the passenger's receipt. This leaf is bound in the booklet along with the others but is not perforated as the others and therefore remains a permanent part of the booklet and its covers which the passenger may retain for his records. With the exception of the letter in the upper left hand corner, the words "Passenger's receipt", and the fact that this sheet is printed on plain white paper it is the duplicate of sheet 23. The backs of sheets 23 and 25 may be utilized for printing thereon conditions under which the ticket has been sold.

Figure 7:
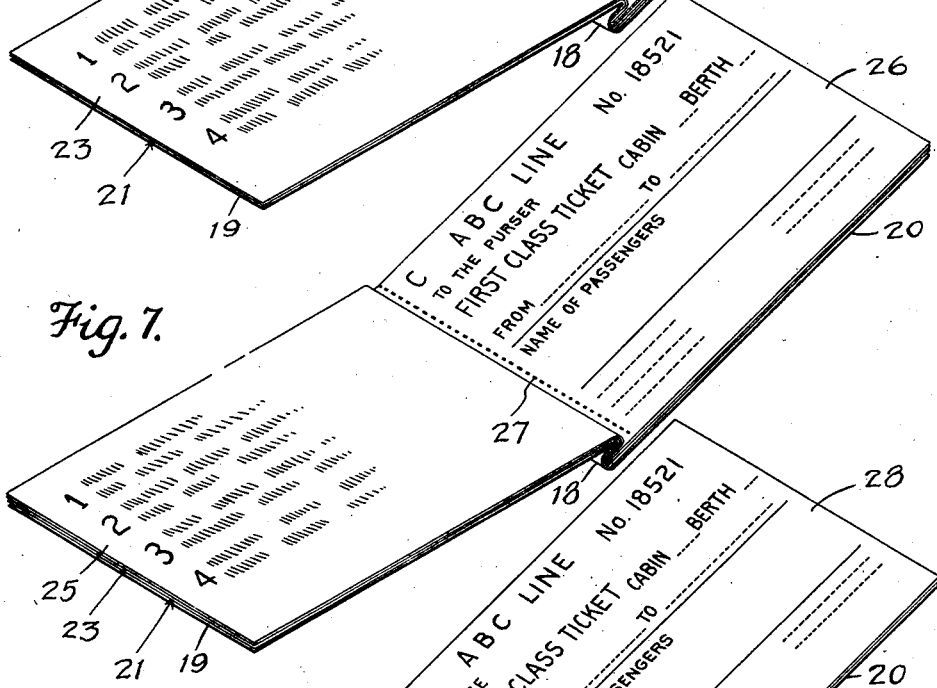
Figure 8:
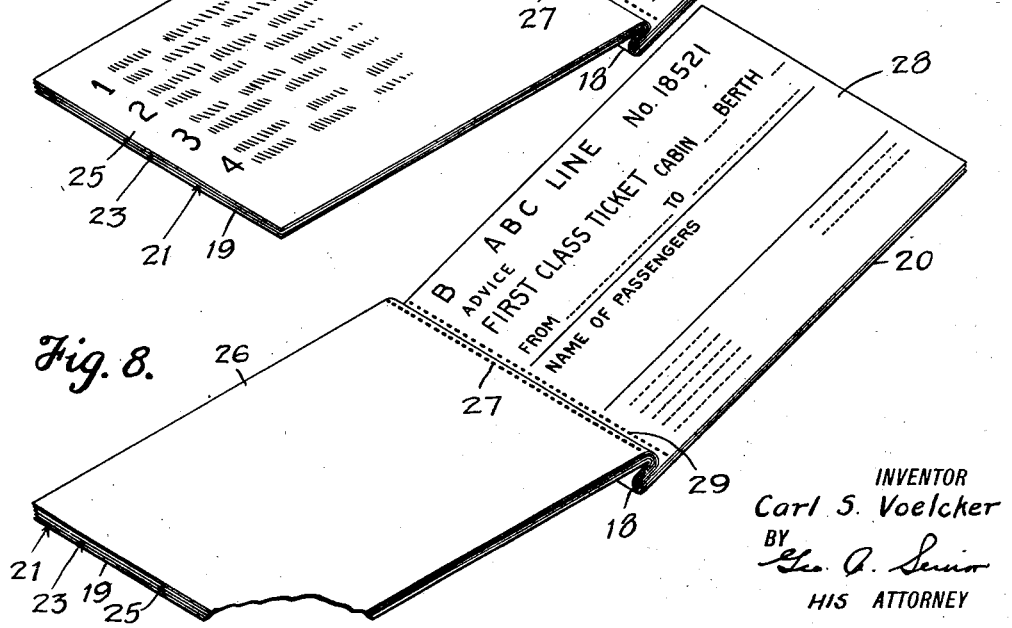

The next leaf or sheet 26 as shown in Fig. 7, is perforated at 27 and is intended to be collected on the boat by the purser or his representative. The printing on this sheet is similar to that of sheets 23 and 25 except for the letter and the words "To the purser" and it might be printed on plain paper with a bluish tint.

The following sheet in the booklet (see Fig. 8) is marked 28 and is perforated at 29 for the purpose of being easily removed. This sheet might be printed on paper of a pinkish tint and bears the letter "B" and the word "Advice". Otherwise the printing is similar to the sheets previously described. However in the lower left hand corner some extra lines may be added for putting in the amounts of the agent's commission for selling the ticket and the net amount remitted to the company. This sheet is removed from the booklet by the agent after the ticket has been made out and before the booklet has been turned over to the purchaser. He immediately forwards this sheet with the amount paid for the ticket, less his commission, to the office of the steamship company.

The last sheet 30 which is perforated at 31 is the agent's stub. This ticket which may be printed on yellow paper is similar in all respects to sheet 28, except for the letter "A" and words "Agent's stub." This sheet has two holes 32 and after it has been torn out of the booklet by the agent it is placed on the clip or fasteners 17 on the cover of the binder. In this way it is preserved and acts as the agent's record.

The rear covers 20 of the booklet are provided with extensions 33 which are secured in the binder as illustrated in Fig. 10. These extensions 33 are perforated at 34 so that after the ticket has been made out it may be easily and readily removed from the binder.

While perforations have been spoken of in numerous places throughout the specification it is desired to call attention to the fact that any means that may be utilized to weaken the sheets so that they may readily be removed from the binder or the booklet may be used instead of the perforations. Likewise with the color of the different sheets, they may be of any desired color or all of one color and they may be arranged in any desired order.

A sufficient number of carbon sheets 36 are secured in the binder under the booklets in any appropriate manner. In starting a new book or binder the agent pulls the carbons out and inserts them between the leaves of the first booklet. He is then ready to make out the first ticket.

From the foregoing it is thought that it may readily be seen that a very simple and efficient method is thus provided for making out the tickets. The larger steamship companies have a vast number of agents scattered throughout the country. The booklets are bound up in binders containing ten, twenty or any desired number and are forwarded to the agents. The tickets being in such concise form the agent may easily place the complete binder containing ten or twenty tickets in his pocket, if he desires to go out of his office and call on a person to make out their tickets. Instead of having a large sheet of paper to spread out and a number of tickets to duplicate all he has to do is fill out the Government information slip and write out one ticket with the carbons in the booklet to take care of the remaining sheets. He tears the booklet from the binder, removes the last two sheets of which he retains one and forwards the other to the company, and then turns the booklet over to the purchaser.

The passenger is then provided with a ticket that is exceedingly convenient to use. The ticket is of such size that it may readily be folded and placed in a lady's purse. When the passenger boards the ship it is a simple matter for the officer in charge at the gangplank to tear out the first two leaves instead of having to unfold a large sheet and remove part of it. The records are all kept in a simple manner and opportunities for errors or mistakes are greatly lessened.

In the form shown in Figs. 12 and 13 the booklets are retained in the binder by extensions 40 from the sheets 30. This is the sheet that acts as the agent's record and as it is torn off along the perforation 31, the booklet is removed from the binder and the sheet remains in the binder. There are no perforations adjacent the binding portion of the binder such as the perforations 34 in the extension 33. In this form the clips or fasteners 17 may be eliminated and there is no probability of the sheets becoming lost or misplaced. Otherwise the form illustrated in Figs. 12 and 13 is similar in all respects to that of the preceding figures.

While a preferred form of the invention has been illustrated and described it is desired to call attention to the fact that numerous changes may be made in form and detail without departing from the spirit of the invention or the scope of the appended claims.

I claim:

1. An article of the kind described, comprising a binder, and a plurality of booklets, each booklet having a plurality of separate sheets and cover sheets bound together, one of said cover sheets being secured in said binder at its free end and a line of perforations in said cover sheet upon which it may be torn when it is desired to remove the booklet from the binder.

2. An article of the kind described, comprising a binder, a plurality of booklets, each booklet having a plurality of separate sheets and cover sheets bound together, one of said cover sheets being secured in said binder at its free end, a line of perforations in said cover sheet upon which it may be torn when it is desired to remove the booklet from the binder, and spacers between certain of successive binding margins of said cover sheets.

In testimony whereof I affix my signature.

CARL S. VOELCKER.